US011738599B2

(12) United States Patent
Paschall et al.

(10) Patent No.: US 11,738,599 B2
(45) Date of Patent: Aug. 29, 2023

(54) GRAPHENE AS ADDITIVE IN SILICA TREAD APPLICATIONS

(71) Applicant: Akron Polymer Solutions, Inc., Rancho Santa Margarita, CA (US)

(72) Inventors: Douglas Paschall, Rancho Santa Margarita, CA (US); Adel F. Halasa, Akron, OH (US); Michael Brendan Rodgers, Leander, TX (US)

(73) Assignee: Akron Polymer Solutions, Inc.

( * ) Notice: Subject to any disclaimer, the term of this patent is extended or adjusted under 35 U.S.C. 154(b) by 0 days.

(21) Appl. No.: 17/812,837

(22) Filed: Jul. 15, 2022

(65) Prior Publication Data

US 2023/0033641 A1 Feb. 2, 2023

Related U.S. Application Data

(63) Continuation-in-part of application No. 17/812,559, filed on Jul. 14, 2022, now Pat. No. 11,597,821, and a continuation-in-part of application No. 17/812,578, filed on Jul. 14, 2022.

(60) Provisional application No. 63/228,389, filed on Aug. 2, 2021, provisional application No. 63/222,112, filed on Jul. 15, 2021, provisional application No. 63/222,101, filed on Jul. 15, 2021, provisional application No. 63/222,103, filed on Jul. 15, 2021.

(51) Int. Cl.
| | |
|---|---|
| *B60C 1/00* | (2006.01) |
| *C08K 3/04* | (2006.01) |
| *C08K 3/36* | (2006.01) |
| *C08K 5/00* | (2006.01) |
| *C08K 5/18* | (2006.01) |
| *C08F 236/10* | (2006.01) |
| *C08K 5/3437* | (2006.01) |

(52) U.S. Cl.
CPC .......... *B60C 1/0016* (2013.01); *B60C 1/0008* (2013.01); *C08F 236/10* (2013.01); *C08K 3/042* (2017.05); *C08K 3/36* (2013.01); *C08K 5/005* (2013.01); *C08K 5/18* (2013.01); *C08K 5/3437* (2013.01); *B60C 2200/04* (2013.01); *C08K 2201/006* (2013.01); *C08K 2201/014* (2013.01)

(58) Field of Classification Search
CPC .... B60C 1/00; C08K 3/04; C08K 3/36; C08K 5/00; C08K 5/18; C08F 236/10
USPC .......................................... 524/87
See application file for complete search history.

(56) References Cited

U.S. PATENT DOCUMENTS

| | | | |
|---|---|---|---|
| 2010/0096597 A1 | 4/2010 | Prud'Homme et al. | |
| 2011/0046289 A1 | 2/2011 | Zhamu et al. | |
| 2013/0150516 A1 | 6/2013 | Lettow | |
| 2013/0296479 A1* | 11/2013 | Martin | B82Y 30/00 524/575.5 |
| 2017/0144491 A1 | 5/2017 | Dahlke et al. | |
| 2021/0155780 A1 | 5/2021 | Dennis-Pelcher | |

FOREIGN PATENT DOCUMENTS

| | | |
|---|---|---|
| CN | 105949534 A | 9/2016 |
| CN | 108192169 B | 6/2020 |
| EP | 2313256 B1 | 12/2020 |
| WO | WO2021052951 A1 | 3/2021 |

OTHER PUBLICATIONS

Heo, Joo Hyung; PCT International Search Report; PCT/US2022/073791; dated Nov. 11, 2022; 4 pages.
Heo, Joo Hyung; PCT Written Opinion; PCT/US2022/073791; dated Nov. 11, 2022; 6 pages.
Heo, Joo Hyung; Korean International Search Report; PCT/US2022/072241; dated Sep. 5, 2022; 5 pages.
Heo, Joo Hyung; Korean Written Opinion; PCT/ US2022/072241; dated Sep. 5, 2022; 6 pages.

* cited by examiner

*Primary Examiner* — Deve V Hall
(74) *Attorney, Agent, or Firm* — Emerson Thomson Bennett; Daniel A. Thomson (57) ABSTRACT

The introduction of graphene as an additive in rubber compounds is disclosed. The product shows increased barrier protection for tire innerliners, with no tradeoffs in other characteristics.

17 Claims, 8 Drawing Sheets

GRAPHENE AS ADDITIVE IN SILICA TREAD APPLICATIONS

I. BACKGROUND

This application is a continuation-in-part of and claims priority to U.S. Ser. No. 17/812,559, filed Jul. 14, 2022 and U.S. Ser. No. 17/812,578, filed Jul. 14, 2022. This application also claims priority to U.S. Ser. No. 63/222,101, filed Jul. 15, 2021, U.S. Ser. No. 63/222,112, filed Jul. 15, 2021, U.S. Ser. No. 63/222,103, filed Jul. 15, 2021, and U.S. Ser. No. 63/228,389, filed Aug. 2, 2021, the contents of which are hereby incorporated by reference. The present teaching is directed to the use of graphene as an additive. More specifically, the present technology is directed to the use of graphene as an additive in silica tread applications.

Graphene is an allotrope of carbon consisting of a single layer of atoms arranged in a two-dimensional honeycomb lattice. The hexagonal lattice structure of isolated, single-layer graphene can be directly seen with transmission electron microscopy (TEM) of sheets of graphene suspended between bars of a metallic grid. Some of these images showed a "rippling" of the flat sheet, with amplitude of about one nanometer. The hexagonal structure is also seen in scanning tunneling microscope (STM) images of graphene supported on silicon dioxide substrates. Ab initio calculations show that a graphene sheet is thermodynamically unstable if its size is less than about 20 nm and becomes the most stable fullerene (as within graphite) only for molecules larger than 24,000 atoms. Each atom in a graphene sheet is connected to its three nearest neighbors by a σ-bond, and contributes one electron to a conduction band that extends over the whole sheet. This is the same type of bonding seen in carbon nanotubes and polycyclic aromatic hydrocarbons, and (partially) in fullerenes and glassy carbon. These conduction bands make graphene a semimetal with unusual electronic properties that are best described by theories for massless relativistic particles. Charge carriers in graphene show linear, rather than quadratic, dependence of energy on momentum, and field-effect transistors with graphene can be made that show bipolar conduction. Charge transport is ballistic over long distances; the material exhibits large quantum oscillations and large and nonlinear diamagnetism. Graphene conducts heat and electricity very efficiently along its plane. The material strongly absorbs light of all visible wavelengths, which accounts for the black color of graphite; yet a single graphene sheet is nearly transparent because of its extreme thinness. The material is also about 100 times stronger than would be the strongest steel of the same thickness.

Single layers of carbon atoms are grown epitaxially on top of other materials. This "epitaxial graphene" consists of a single-atom-thick hexagonal lattice of $sp^2$-bonded carbon atoms, as in free-standing graphene. However, there is significant charge transfer between the two materials, and, in some cases, hybridization between the d-orbitals of the substrate atoms and it orbitals of graphene; which significantly alter the electronic structure compared to that of free standing graphene.

Three of the four outer-shell electrons of each atom in a graphene sheet occupy three $sp^2$ hybrid orbitals—a combination of orbitals s, $p_x$ and $p_y$—that are shared with the three nearest atoms, forming σ-bonds. The length of these bonds is about 0.142 nanometers. The remaining outer-shell electron occupies a $p_z$ orbital that is oriented perpendicularly to the plane. These orbitals hybridize together to form two half-filled bands of free-moving electrons, π and π*, which are responsible for most of graphene's notable electronic properties. Graphene sheets stack to form graphite with an interplanar spacing of 0.335 nm (3.35 Å). Graphene sheets in solid form usually show evidence in diffraction for graphite's layering.

Graphene is a zero-gap semiconductor, because its conduction and valence bands meet at the Dirac points. The Dirac points are six locations in momentum space, on the edge of the Brillouin zone, divided into two non-equivalent sets of three points. The two sets are labeled K and K'. The sets give graphene a valley degeneracy of gv=2. By contrast, for traditional semiconductors the primary point of interest is generally Γ, where momentum is zero. Four electronic properties separate it from other condensed matter systems. However, if the in-plane direction is no longer infinite, but confined, its electronic structure would change. They are referred to as graphene nanoribbons. If it is "zig-zag," the bandgap would still be zero. If it is "armchair," the bandgap would be non-zero. Graphene's hexagonal lattice can be regarded as two interleaving triangular lattices. This perspective was successfully used to calculate the band structure for a single graphite layer using a tight-binding approximation. Electrons propagating through graphene's honeycomb lattice effectively lose their mass, producing quasi-particles that are described by a 2D analogue of the Dirac equation rather than the Schrödinger equation for spin-½ particles.

Graphene displays remarkable electron mobility at room temperature, with reported values in excess of 15000 $cm^2 \cdot V^{-1} \cdot s^{-1}$. Hole and electron mobilities are nearly the same. The mobility is independent of temperature between 10 K and 100 K. and shows little change even at room temperature (300 K), which implies that the dominant scattering mechanism is defect scattering. Scattering by graphene's acoustic phonons intrinsically limits room temperature mobility in freestanding graphene to 200000 $cm^2 \cdot V^{-1} \cdot s^{-1}$ at a carrier density of $10^{12}$ $cm^{-2}$. The corresponding resistivity of graphene sheets would be $10^{-6}$ Ω·cm. This is less than the resistivity of silver, the lowest otherwise known at room temperature. However, on $SiO_2$ substrates, scattering of electrons by optical phonons of the substrate is a larger effect than scattering by graphene's own phonons. This limits mobility to 40000 $cm^2 \cdot V^{-1} \cdot s^{-1}$. Charge transport has major concerns due to adsorption of contaminants such as water and oxygen molecules. This leads to non-repetitive and large hysteresis 1–V characteristics. Electrical resistance in 40-nanometer-wide nanoribbons of epitaxial graphene changes in discrete steps. The ribbons' conductance exceeds predictions by a factor of 10. The ribbons can act more like waveguides or quantum dots, allowing electrons to flow smoothly along the ribbon edges. In copper, resistance increases in proportion to length as electrons encounter impurities. Transport is dominated by two modes. One is ballistic and temperature independent, while the other is thermally activated. Ballistic electrons resemble those in cylindrical carbon nanotubes. At room temperature, resistance increases abruptly at a particular length—the ballistic mode at 16 micrometers and the other at 160 nanometers (1% of the former length).

Graphene's permittivity varies with frequency. Over a range from microwave to millimeter wave frequencies it is roughly 3.3. This permittivity, combined with the ability to form both conductors and insulators, means that theoretically, compact capacitors made of graphene could store large amounts of electrical energy. Graphene's unique optical properties produce an unexpectedly high opacity for an atomic monolayer in vacuum, absorbing $\pi\alpha \approx 2.3\%$ of light, from visible to infrared. Here, $\alpha$ is the fine-structure constant.

When single-layer graphene is supported on an amorphous material, the thermal conductivity is reduced to about 500-600 $W \cdot m^{-1} \cdot K^{-1}$ at room temperature as a result of scattering of graphene lattice waves by the substrate, and can be even lower for few layer graphene encased in amorphous oxide. Likewise, polymeric residue can contribute to a similar decrease in the thermal conductivity of suspended graphene to approximately 500 to 600 $W \cdot m^{-1} \cdot K^{-1}$ for bilayer graphene. It has been suggested that the isotopic composition, the ratio of $^{12}C$ to $^{13}C$, has a significant impact on the thermal conductivity. For example, isotopically pure $^{12}C$ graphene has higher thermal conductivity than either a 50:50 isotope ratio or the naturally occurring 99:1 ratio. It can be shown by using the Wiedemann-Franz law, that the thermal conduction is phonon-dominated. Potential for this high conductivity can be seen by considering graphite, a 3D version of graphene that has basal plane thermal conductivity of over a 1000 $W \cdot m^{-1} \cdot K^{-1}$ (comparable to diamond). In graphite, the c-axis (out of plane) thermal conductivity is over a factor of ~100 smaller due to the weak binding forces between basal planes as well as the larger lattice spacing. Despite its 2-D nature, graphene has three acoustic phonon modes. The two in-plane modes (LA, TA) have a linear dispersion relation, whereas the out of plane mode (ZA) has a quadratic dispersion relation. Due to this, the $T^2$ dependent thermal conductivity contribution of the linear modes is dominated at low temperatures by the $T^{1.5}$ contribution of the out of plane mode.

The (two-dimensional) density of graphene is 0.763 mg per square meter. Graphene has an intrinsic tensile strength of 130 GPa (19,000,000 psi) (with representative engineering tensile strength ~50-60 GPa for stretching large-area freestanding graphene) and a Young's modulus (stiffness) close to 1 TPa (150,000,000 psi). The spring constant of suspended graphene sheets has been measured using an atomic force microscope (AFM). Graphene sheets were suspended over $SiO_2$ cavities where an AFM tip was used to apply a stress to the sheet to test its mechanical properties. Its spring constant was in the range 1-5 N/m and the stiffness was 0.5 TPa, which differs from that of bulk graphite.

Graphene has a theoretical specific surface area (SSA) of 2630 $m^2/g$. This is much larger than for carbon black (typically smaller than 900 $m^2/g$) or for carbon nanotubes (CNTs), from $\approx$100 to 1000 $m^2/g$ and is similar to activated carbon. Graphene is the only form of carbon (or solid material) in which every atom is available for chemical reaction from two sides (due to the 2D structure). Atoms at the edges of a graphene sheet have special chemical reactivity. Graphene has the highest ratio of edge atoms of any allotrope. Defects within a sheet increase its chemical reactivity. The onset temperature of reaction between the basal plane of single-layer graphene and oxygen gas is below 260° C. (530 K). Graphene burns at very low temperature (e.g., 350° C. (620 K)). Examples of types of graphene are monolayer sheets, bilayer graphene, graphene superlattices, graphene nanoribbons, graphene quantum dots, graphene oxide, reduced graphene oxide, pristine graphene, graphene ligand/complex, graphene fiber, 3D graphene, pillared graphene, reinforced graphene, molded graphene, graphene aerogel, graphene nanocoil, and crumpled graphene. The present teaching uses graphene forms which exfoliate into monolayer sheets, as in a polymer nanocomposite, and are of an inert condition. i.e., limited to no chemical functionality such as carboxylic acid, ketone, aldehyde, or hydroxyl groups on the graphene plate surface or plate edges.

II. SUMMARY

Graphene in polymer nanocomposites has been reported to contain many attributes such as antioxidant properties, thermal conductivity, electrical conductivity, and reduction in permeability. Abrasion resistance of rubber nanocomposites is also noted, suggesting better tire wear. In addition, improvement in hysteresis (measured by the loss modulus in shear or in tension (G" or E") divided by the storage modulus, either in shear or in tension (G' or E') to calculate the tangent delta) has been noted. In this instance such improvements can facilitate reductions in whole tire rolling resistance, with no loss in traction qualities.

In addition to the thermal properties of graphene, it is reported to show the following properties: electrical conductivity, odorless and no known toxicity, inert, and in polymer composites, demonstrates impermeability. It is therefore desirable to provide graphene as an additive to rubber compounds. Applications where impermeability is desirable are, for example, automotive air conditioning hoses, bladders, rubber sheeting, and the innerliner of a tire. In this specific case, it teaches the reduction of permeability of a tire innerliner beyond that achieved by use of compounded bromobutyl polymers and chlorobutyl polymers, which sometimes is used in automobile air conditioning hose and other comparable applications, such as sheeting.

The present teaching further focuses on innerliners for automobile tires, light truck tires, and tires for commercial vehicles, which all typically use innerliners based on compounded bromobutyl polymers, but is equally applicable to innerliners using chlorobutyl polymers. Bromobutyl used in the present teaching has a nominal bromine content of 2.0 weight percent (wt. %) and Mooney viscosity between 26 and 52 Mooney Units, and typically 32+/−2 Mooney Units. Mooney viscosity of the polymer is measured according to the procedure described in ASTM D1624 at 125° C. using a large rotor and testing for 8 minutes, after a 1.0 minute preheat to generate a number described as ML1+8.

Innerliner compound formulation will also contain carbon black, including the grades N660. N762, or N774. Rubber compound process oils can be paraffin, naphthenic, or the derivative described as mild extraction solvate (MES), aromatic or its derivative, treated distillate aromatic extract (TDAE), or residual aromatic extract (RAE). Tackifying resins, such as those produced from C5 monomers or aromatic monomers, are added to the bromobutyl innerliner compound formulation to further improve compound factory processing. In the present teachings, an exemplary C5 resin is purchased from ExxonMobil, identified as Escorez 1102114. In the present teaching. Escorez 1102™ was blended with a phenolic tackifying resin (Koresin® from BASF), to further optimize tack and compound processing. The process aids required for a halobutyl formulation also include a homogenization agent to aid uniform dispersion of the compounding additives. There are a number available, but in the present teaching. Struktol 40MS™ was selected. The final part of the compound formulation is the vulcanization system, which in the case of halobutyl compounds typically contains four chemicals—zinc oxide, stearic acid, sulfur, and an accelerator to promote the vulcanization reaction. For halobutyl compounds the accelerator 2,2-dithiobis(benzothiazole), sometimes referred to as MBTS, is used near universally in tire innerliners for this purpose. The amount of each material used in the innerliner compound or compound in any other application is expressed relative to the total amount of polymer which is expressed as 100.00 parts per hundred rubber or PHR. The amount of each compounding additive in the formulation is expressed in PHR relative to the amount of weight of polymer at 100.00 as can be seen in Example 1 Table 1.

Such formulations may also contain inorganic fillers, in addition to carbon black, to optimize cost. Such fillers are kaolin clays, talc, and calcium carbonate. However, such fillers can create factory processing challenges such as excessive tack.

In the case of tires, the gauge of an innerliner containing 100.00 PHR of bromobutyl polymer, compounded as described, will be 1.00 millimeter (mm) for passenger and light truck tires, and 2.00 mm for commercial heavy duty truck and bus tires, and extend uniformly and fully from the lower bead, or toe, of the tire on one side to the same position on the opposite side of the tire, thus allowing full interior innerliner material coverage. Such attainment is necessary for satisfactory tire—vehicle performance.

Further reference to the art of compounding tire innerliners may be obtained in the text, *Rubber Compounding Chemistry and Applications* by B. Rodgers and published by CRC Press. Such innerliner compositions allow for adequate performance of a typical tire referring specifically to tire air retention quality, tire rolling resistance attributable to air retention qualities, tire—vehicle handling and stability performance, wear, traction, and durability. Further reference to the impact of tire innerliner quality and tire performance can be found in the text. *Tire Engineering* by B. Rodgers and published by CRC Press.

New generation vehicles such as electric powered automobiles are driving significant need in tires where major improvement in tire inflation pressure retention is needed. Whole tire rolling resistance is increasingly important due to vehicle energy consumption. Reductions in green-house gas emissions and safety are further factors of importance. Reductions in whole tire rolling resistance must not be achieved through loss in safety and durability. Improvements in tire air pressure retention have an immediate impact on tire warranty claims, improved vehicle fuel efficiency, reductions in emissions, and improved tire and traction wear performance.

Additionally, improvement in innerliner quality, through addition of an additive, must not negatively impact manufacturing efficiency, either in compound mixing and handling, extrusion and calendaring, handling at tire building machines, or be a source of blemishes and defects on final product inspection.

It is thus desirable to provide graphene as an additive in rubber compounds, in particular to the innerliner of a tire. The present teaching enables improvement in air retention in tires. The teachings are equally applicable to other automotive products such as hoses, which use a halobutyl liner to minimize gas or other medium permeation through the part, thereby ensuring pressure retention and no loss to the environment of cooling mediums. It is also contemplated to include graphene in caulks, sealants, seals, gaskets, medical gloves, beverage bottles, and chemical and solvent resistant gloves.

The present teaching demonstrates reducing the liner permeability beyond that achieved by bromobutyl and chlorobutyl polymers.

The present teaching demonstrates graphene and silica tread compound applications.

Still other benefits and advantages of the present subject matter will become apparent to those skilled in the art to which it pertains upon a reading and understanding of the following detailed specification.

III. BRIEF DESCRIPTION OF THE DRAWINGS

The present teachings are described hereinafter with reference to the accompanying drawings.

IV. DETAILED DESCRIPTION

With reference to FIGS. 1-4, in one aspect of the present teaching, a tire innerliner is a calendered halobutyl rubber sheet compounded with additives that result in low air permeability. The innerliner assures that the tire will hold high-pressure air inside, without an inner tube, minimizing diffusion through the rubber structure. Compounding is the operation of bringing together all the ingredients required to mix a batch of rubber compound. Each component has a different mix of ingredients according to the properties required for that component. Mixing is the process of applying mechanical work to the ingredients in order to blend them into a homogeneous substance. Internal mixers are often equipped with two counter-rotating rotors in a large housing that shear the rubber charge along with the additives. The mixing is done in two or three stages to incorporate the ingredients in the desired order. The shearing action generates considerable heat, so both rotors and housing are water-cooled to maintain a temperature low enough to assure that vulcanization does not begin.

With continuing reference to FIGS. 1-4, the graphene is added to the rubber and mixed as noted above. Graphene will be added to a rubber formulation, such as one based on bromobutyl, at levels from about 0.1 PHR to about 50.0 PHR, including about 0.5 PHR to about 45.0 PHR, about 0.5 PHR to about 40.0 PHR, about 0.5 PHR to about 35.0 PHR, about 0.5 PHR to about 30.0 PHR, about 0.5 PHR to about 25.0 PHR, about 0.5 PHR to about 20.0 PHR, about 0.5 PHR to about 15.0 PHR, and from 0.5 PHR to 10.0 PHR. In another aspect of the present teachings, the graphene is added at less than about 50.0 PHR, less than about 45.0 PHR, less than about 30.0 PHR, less than about 25.0 PHR, less than about 20.0 PHR, less than about 15.0 PHR, and less than about 10.0 PHR. In another aspect of the present teachings, the graphene is added at greater than about 0.5 PHR, greater than about 1.0 PHR, greater than about 5.0 PHR, greater than about 10.0 PHR, greater than about 15.0 PHR, greater than about 20.0 PHR, greater than about 25.0 PHR, greater than about 30.0 PHR, greater than about 35.0 PHR, greater than about 40.0 PHR, and greater than about 45.0 PHR. With continuing reference to FIGS. 1-4, the graphene is added to the rubber and mixed as noted above. Graphene in this aspect is described as in Table 1.

TABLE 1

Typical Properties of Graphene

| | |
|---|---|
| Form | Powder, dark grey, odorless |
| Carbon | >95% |
| Particle size | 50 nm to 10 μm |
| Moisture, Oxygen, Ash | <0.75 wt. %, <2.0 wt. %, <4.5 wt. %, respectively |
| Resistivity | <150 ohm cm |
| Particle (sheet) thickness) | <3.2 nm |
| Particle layers | <16 |
| Specific gravity | 2. gm/cubic centimeter |
| Surface area (specific) | 180 square m$^2$/gm |

The particle size range of graphene used in the present teachings can range from about 50 nm to about 10 Mm. In one aspect, the particle size range is from about 100 nm to about 5 μm. In one aspect, the particle size range is greater than about 50 nm, greater than about 100 nm, greater than about 150 nm, greater than about 200 nm, greater than about 250 nm, greater than about 300 nm, greater than about 350 nm, greater than about 400 nm, greater than about 450 nm, greater than about 500 nm, greater than about 550 nm, greater than about 600 nm, greater than about 650 nm, greater than about 700 nm, greater than about 750 nm, greater than about 800 nm, greater than about 850 nm, greater than about 900 nm, greater than about 950 nm, greater than about 1 μm, greater than about 2 μm, greater than about 3 μm, greater than about 4 μm, greater than about 5 μm, greater than about 6 μm, greater than about 7 μm, greater than about 8 μm, or greater than about 9 μm. In one aspect, the particle size range is less than about 10 μm, less than about 9 μm, less than about 8 μm, less than about 7 μm, less than about 6 μm, less than about 5 μm, less than about 4 μm, less than about 3 μm, less than about 2 μm, less than about 1 μm, less than about 950 nm, less than about 900 nm, less than about 850 nm, less than about 800 nm, less than about 750 nm, less than about 700 nm, less than about 650 nm, less than about 600 nm, less than about 550 nm, less than about 500 nm, less than about 450 nm, less than about 400 nm, less than about 350 nm, less than about 300 nm, less than about 250 nm, less than about 200 nm, less than about 150 nm, or less than about 100 nm. The form is plate-like rather that cylindrical or fibrous. To further define the material, carbon content is greater than 95%, and in one aspect greater than 99%. The carbon content can be greater than 96%, greater than 97%, or greater than 98% as well. Ash and oxygen content is less than 1% in one aspect of the present teachings. In one aspect, the average particle thickness is about 2.5 nm and the number of layers in a particle would is less than 15, thus allowing attainment of a near exfoliated condition when compounded. Specific surface area of the graphene plate will range from 100 m$^2$/gram to 250 m$^2$/gram and in one aspect is about 180 m$^2$/gram. In one aspect, the surface area of the graphene plate is greater than 150 m$^2$/gram, greater than 100 m$^2$/gram, less than 250 m$^2$/gram, less than 200 m$^2$/gram, or less than 150 m$^2$/gram.

Figure 1:
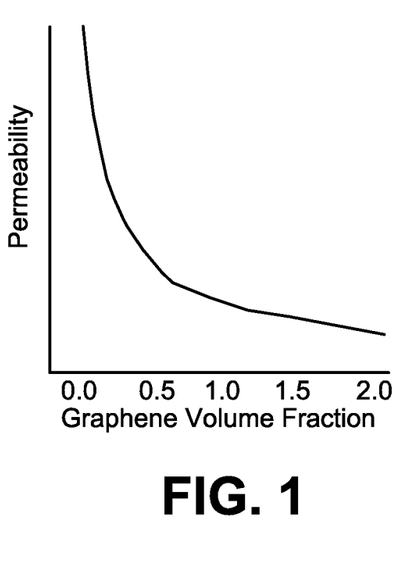
FIG. 1 depicts a graph showing rapid reduction in permeability.
Figure 2:
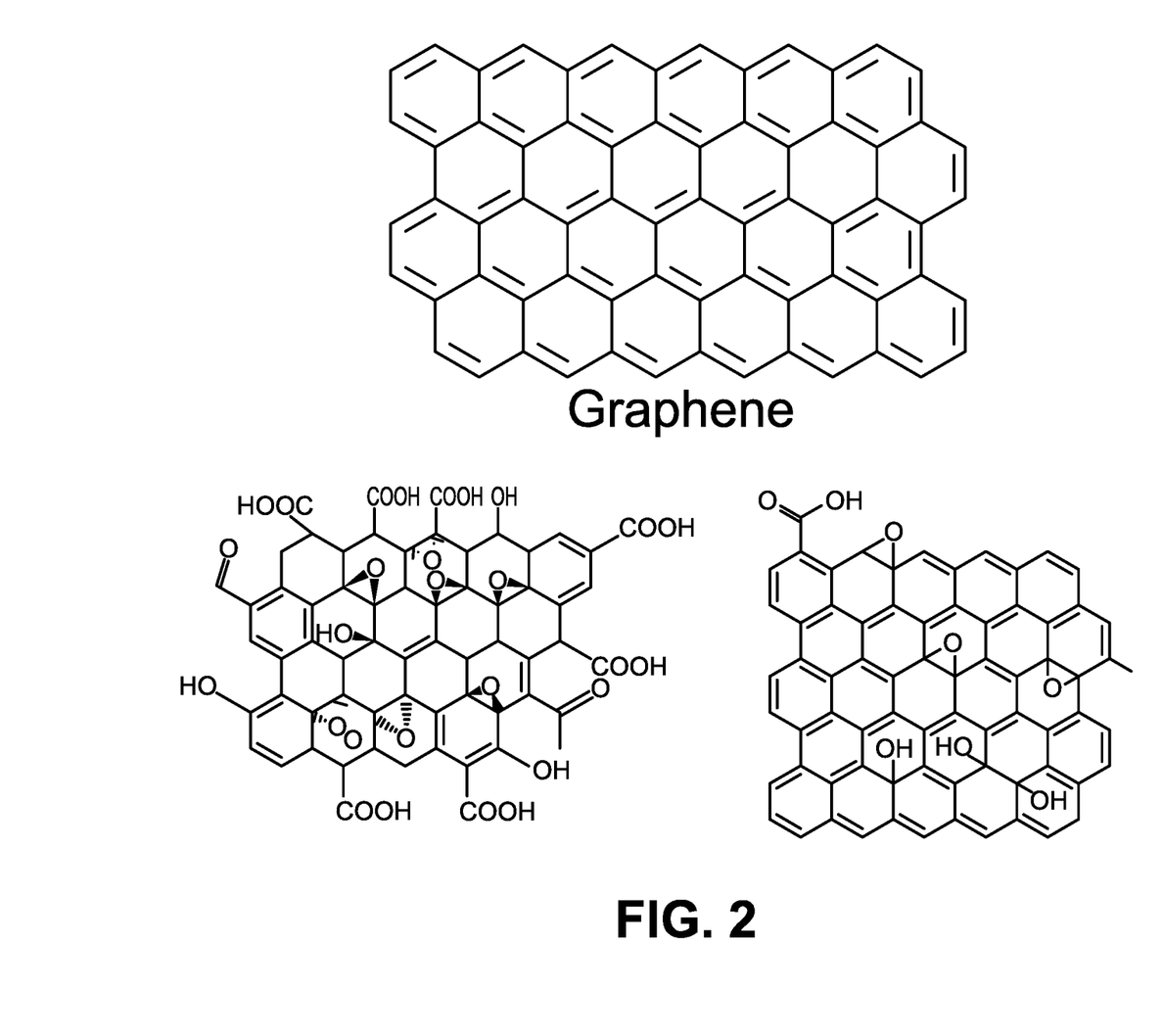
FIG. 2 depicts the structures of graphene, graphene oxide, and reduced graphene oxide.
Figure 3:
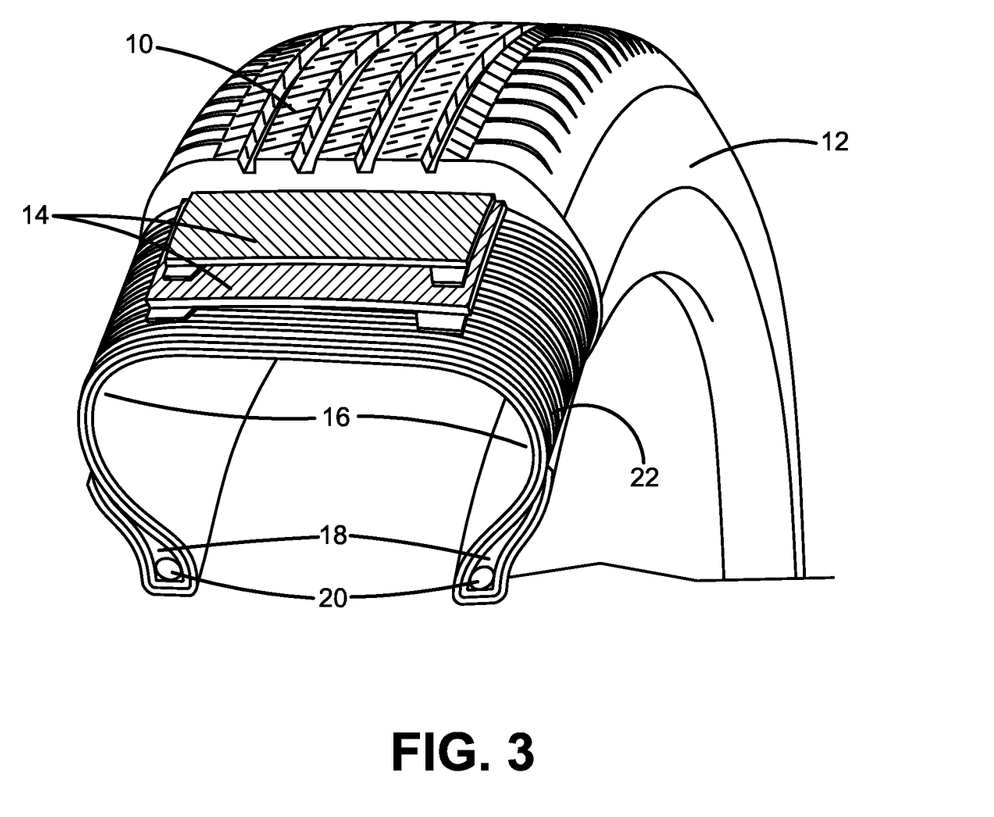
FIG. 3 depicts a tire.

Graphene is added to the rubber compound formulations at between about 0.0 PHR and about 50.00 PHR, including in the range of about 0.5 PHR to about 8.00 PHR. Reductions in compound permeability initially show a large decrease (as shown in FIG. 1), tapering as graphene levels increase. Gas-permeability decreases with increasing graphene loading of about 0.4 vol % in rubber composites. The percolation threshold is about 40 times lower than that for clay-based composites. According to the Nielsen model on gas permeability, the thickness of an individual graphene based sheet dispersed in the graphene styrene-butadiene rubber (SBR) composite with 2.0 vol. % of GO was predicted to be 1.47 nm.

Graphene, when added to a bromobutyl rubber compound formulation, can be in various forms and which can be part of the present teaching, such as a powder, in pastilles or pellets using wax as a carrier, aiding dust suppression, in pre-weight sealed, low-melt temperature polyethylene bags, and melt or solution blended with a compatible polymer, such as butyl rubber or halobutyl rubber and then compounded as part of the total rubber hydrocarbon content.

Figure 4:
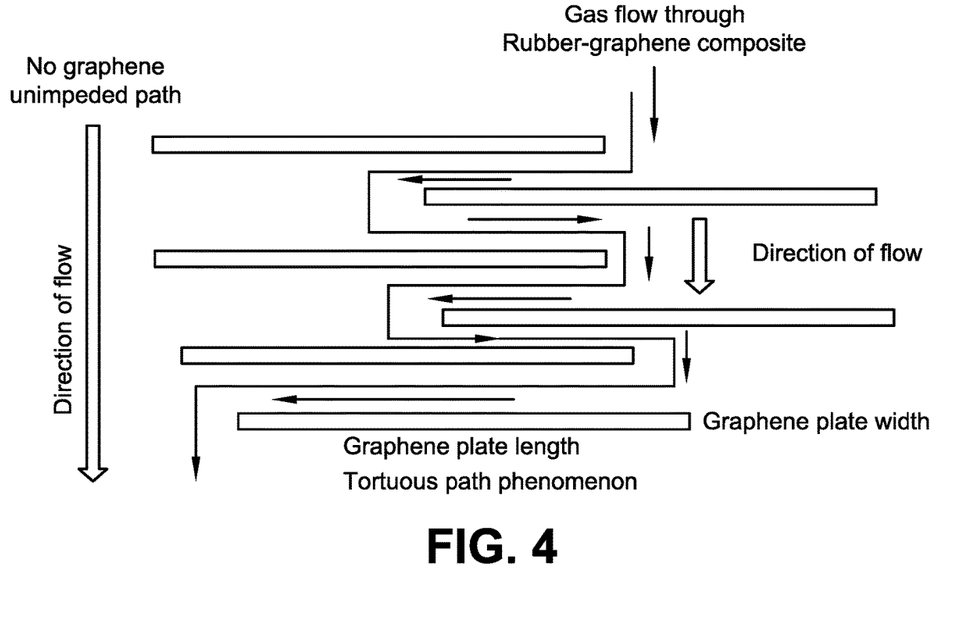
FIG. 4 is a graphical representation of the graphene plates acting as a barrier to gas flow.

Graphene has an aspect ratio of near 1000, assuming the graphene plate thickness is about 1 nm. The plate length/diameter can be up to about 1 micron. The graphene can thus function as a barrier. The graphene exfoliates into sheets when added to the rubber compound, which improves the barrier properties when perpendicular alignment to the sheet direction is achieved. The graphene plates provide a barrier to oxygen and nitrogen migration, and moisture or water vapor molecules migrating through the liner compound of the tire or other product requiring such properties. Such gas molecule transport phenomenon is described as a "tortuous path" as shown in FIG. 4. With continuing reference to FIGS. 1-4, with the addition of graphene as a filler, there is no trade-off or loss in conventional processing and mechanical properties. Graphene has a very high aspect ratio. Small amounts have a large impact on reducing permeability. The nominal aspect ratio of graphene of up to 1000 compares with the typical aspect ratio of 20 for kaolin clay fillers. The clay fillers have to be added at about 40 PHR and also need a surfactant for compatibility. Due to the relatively large size of the graphene plates versus inorganic fillers, graphene can be added at about 1 PHR to about 2 PHR.

Measurement of Properties of Rubber Compositions

Mooney viscosity (ML1+4) at 100° C. measured in accordance with ASTM D1646. Vulcanization kinetics and associated properties was measured by following the procedure in ASTM D5289. Tensile strength and associated data generated through measurement of tensile strength was determined following ASTM D412. Shore-A Hardness was measured following the method in ASTM D2240. Tear strength and adhesion were measured following ASTM D624. Oxygen permeability was measured using an Ametek Mocon OX-TRAN 2/22 permeability tester and following ASTM D3985. Air permeability determined according to the method in ASTM D1434.

Example 1

In this example tire model innerliner compounds were prepared containing graphene levels, ranging from about 0.00 PHR to about 20.00 PHR. The graphene was first blended with bromobutyl rubber and then added as a masterbatch to the compounds. The amount of free bromobutyl polymer added to the formulation was adjusted with the graphene master-batch to ensure the total polymer content is 100.00 PHR as described earlier. Graphene was added at 0.5 PHR, 2.0 PHR, 5.00 PHR, 8.00 PHR, and 20.0 PHR. Compounds were prepared using a laboratory internal mixer, using a two-stage mixing procedure. The first stage is referred to as non-productive, followed by the final stage or productive phase, where the vulcanization chemicals are added. The formulations are shown in Table 2. Though not necessary, in Table 1 a re-mill is illustrated which can be included in the mixing procedure should it be desired. A re-mill is a procedure where the compound is passed through a mixer for a short period of time so as to optimized final compound viscosity.

The mechanical properties illustrated in Table 3 are equivalent to innerliners with no graphene. This is the case for compounds containing graphene at levels up to about 10 PHR. It is noted that industrial levels of graphene usage will be in the range of about 0.5 PHR to about 10.0 PHR. There is no shift in tensile strength, Mooney viscosity, modulus, tack, green strength, or tear strength. However, there is direction improvement in adhesion, consistent with results from other compound classes.

Example 2

This example shows the excellent reduction in permeability achieved with small amounts of graphene in the bromobutyl innerliner compound. Permeability was measured and two sets of results are reported, (i) permeation of oxygen through the innerliner compounds and (ii) permeation of air. In both instances there is a sharp reduction in permeability with very small amounts of graphene added to the bromobutyl compounds, followed by a less steep drop than would be predicted by computational models proposed by Neilson.

Addition of graphene to the bromobutyl compound shows a very rapid drop in permeability which is required for tire innerliner applications. This drop is considered significantly greater than that possible using other plate-like additives, such as kaolin clays, other clays, or talc nanocomposites. It is noted that this reduced tire liner permeability is useful for electric vehicle tires, truck tires, bus tires, off road tires, farm equipment tires, and aircraft tires. Graphene has an aspect ratio of near 1000, assuming the graphene plate thickness is about 1 nm. The plate length/diameter can be up to about 1 micron. The graphene thus functions as a barrier or creation of the tortuous path noted above (FIG. 4). The graphene exfoliates into sheets when added to the rubber compound, which improves the barrier properties. The graphene plates provide a barrier to oxygen and nitrogen migration through the liner compound of the tire.

TABLE 2

| | Compound | | | | | |
|---|---|---|---|---|---|---|
| | 3 (control) | 1 | 2 | 4 | 5 | 6 |
| | | | Number | | | |
| | ERTNB10-54-03 | ERTNB10-54-01 | ERTNB10-54-02 | ERTNB10-54-04 | ERTNB10-54-05 | ERTNB10-54-06 |
| BIIR 2222 | 100.00 | 98.67 | 94.67 | 86.67 | 78.67 | 46.70 |
| Carbon Black N660 | 60.00 | 60.00 | 60.00 | 60.00 | 60.00 | 60.00 |
| ERTNB10-53-MB | 0.00 | 1.83 | 7.33 | 18.33 | 29.33 | 73.30 |
| Naphthenic oil | 8.00 | 8.00 | 8.00 | 8.00 | 8.00 | 8.00 |
| Struktol 40MS | 7.00 | 7.00 | 7.00 | 7.00 | 7.00 | 7.00 |
| Koresin | 2.00 | 2.00 | 2.00 | 2.00 | 2.00 | 2.00 |
| Escorez 1102 | 2.00 | 2.00 | 2.00 | 2.00 | 2.00 | 2.00 |
| Stearic Acid | 1.00 | 1.00 | 1.00 | 1.00 | 1.00 | 1.00 |
| Zinc Oxide | 1.00 | 1.00 | 1.00 | 1.00 | 1.00 | 1.00 |
| MBTS | 1.25 | 1.25 | 1.25 | 1.25 | 1.25 | 1.25 |
| Sulfur | 0.50 | 0.50 | 0.50 | 0.50 | 0.50 | 0.50 |
| Total | 182.75 | 183.25 | 184.75 | 187.75 | 190.75 | 202.75 |
| Graphene | 0.00 | 0.50 | 2.00 | 5.00 | 8.00 | 20.00 |

| 1st Pass or Non-Productive | |
|---|---|
| Set-up | Start Temp. 65° C., 65 RPM, & 50 Ram pressure |
| 0' | add elastomers and ertnb10-53-MB |
| 0.25' | add carbon black |
| 2' | add others |
| 3' | sweep |
| 3.5' | adjust (increase) rotor speed, ramp temperature to 150° C. at 5' |
| 5' | (try to reach 150° C. at 5') |
| Re-mill if required | |
| Set-up | Start Temp. = RT, 65 RPM, & 50 Ram pressure |
| 0' | ADD 1st Pass MB |
| 3' | DUMP |
| MILL | 1' on mill with mill rolls at R.T. |
| 5' | (try to reach 150° C. at 5') |
| Final Pass Productive | |
| Set-Up | SANDWICH IN CURES |
| 0' | ADD ⅔ of 2nd pass MB |
| 15" | ADD Sulfur, Accelerator pocket, & ⅓ of 2nd pass MB |
| 1' | SWEEP |
| 5' | (try to reach 150° C. at 5') |

TABLE 3

| | | Compound Number | | | | | |
|---|---|---|---|---|---|---|---|
| | | 3 | 1 | 2 | 4 | 5 | 6 |
| | | ERTNB10-54-03 | ERTNB10-54-01 | ERTNB10-54-02 | ERTNB10-54-04 | ERTNB10-54-05 | ERTNB10-54-06 |
| BIIR 2222 | PHR | 100.00 | 100.00 | 100.00 | 100.00 | 100.00 | 100.00 |
| Graphene | PHR | 0.00 | 0.50 | 2.00 | 5.00 | 8.00 | 20.00 |
| Mooney Viscosity | ML 1 + 4 100° C. | 57.80 | 57.50 | 57.60 | 58.70 | 58.60 | 60.40 |
| MDR Rheometer | 160 C. ° | | | | | | |
| Delta Torque | in-lb | 2.59 | 2.67 | 2.75 | 2.58 | 2.74 | 3.18 |
| Ts1 | min | 5.08 | 5.15 | 5.04 | 5.10 | 4.78 | 5.52 |
| T50 | min | 6.15 | 6.32 | 6.24 | 6.12 | 5.90 | 5.52 |
| T90 | min | 12.63 | 12.86 | 12.86 | 12.14 | 11.80 | 12.49 |
| Tack [Tel Tack] | | 3.86 | 2.88 | 3.31 | 3.10 | 3.67 | 5.12 |
| Tensile Strength | MPa | 9.47 | 9.76 | 9.63 | 9.49 | 9.04 | 8.54 |
| Elongation | % | 833 | 836 | 854 | 804 | 785 | 708 |
| 50% Modulus | MPa | 0.72 | 0.73 | 0.75 | 0.93 | 0.91 | 1.28 |
| 100% Modulus | MPa | 1.04 | 1.05 | 1.15 | 1.40 | 1.46 | 2.26 |
| 200% Modulus | MPa | 2.05 | 2.11 | 2.32 | 2.66 | 2.80 | 4.02 |
| 300% Modulus | MPa | 3.39 | 3.51 | 3.66 | 4.04 | 4.09 | 5.21 |
| Shore A | | 54.00 | 54.00 | 53.00 | 56.00 | 57.00 | 60.00 |
| Tear Strength | KN/m | 53.34 | 51.33 | 52.37 | 52.12 | 51.96 | 51.12 |
| Trouser Tear Str. | lbf/in | 147.00 | 153.00 | 142.00 | 149.00 | 157.00 | 169.00 |
| Peel Adhesion | | 79.00 | 71.00 | 73.00 | 73.00 | 86.00 | 46.00 |

TABLE 4

| | | Compound Number | | | | | |
|---|---|---|---|---|---|---|---|
| | | 3 | 1 | 2 | 4 | 5 | 6 |
| | | ERTNB10-54-03 | ERTNB10-54-01 | ERTNB10-54-02 | ERTNB10-54-04 | ERTNB10-54-05 | ERTNB10-54-06 |
| BIIR 2222 | PHR | 100.00 | 100.00 | 100.00 | 100.00 | 100.00 | 100.00 |
| Graphene | PHR | 0.00 | 0.50 | 2.00 | 5.00 | 8.00 | 20.00 |
| | Oxygen Permeability using Ametek Mocon (ASTM D3985) (40° C., 100% $O_2$) | | | | | | |
| Permeation | cc*mm/(m²*day) | 220 | 201 | 168 | 146 | 152 | 101 |
| Permeability | cc*min/(m²*day*mmHg) | 0.289 | 0.264 | 0.221 | 0.192 | 0.200 | 0.133 |
| Rating (Lower is better) | | 100 | 91 | 76 | 73 | 69 | 46 |
| | Air Permeability to ASTM D1434 60 C. ° | | | | | | |
| Permeability | cc STP – cm/ cm2 – s – atm | 2.455 | 1.249 | 1.495 | 1.668 | 1.745 | 1.610 |
| Rating (Lower is better) | | 100 | 51 | 61 | 68 | 71 | 66 |

Note:
Permeation and Permeability coefficients taken from the industry reference formulation (#3) in the text Tire Engineering, CRC Press 2021

With reference to FIGS. 4-12, automobile passenger tire performance parameters include tread wear, traction, and low rolling resistance. Optimization of one property achieved by adjusting polymer content often causes loss on another property. The following Table 5 shows a graphene grade slate.

TABLE 5

| | | Grade | | |
|---|---|---|---|---|
| | | EG016 | MG016 | NCG015 |
| | | Target Application | | |
| | | Electronics | Materials | Nanocomposites |
| Number | | 1 | 2 | 3 |
| Form | | Light powder | Light powder | Light powder |
| Color | | Dark grey/Black | Dark grey/Black | Dark grey/Black |
| Odor | | None | None | None |
| Carbon | wt % | 99.50 | 99.00 | 95.00 |
| $H_2O$ | wt % | 0.35 | 0.50 | 0.75 |
| $O_2$ | wt % | <1.0 | <1.0 | <2.0 |
| Ash | wt % | <0.1 | <0.5 | <4.5 |
| Resistivity (Powder) | ohm cm | <50 | <100 | <150 |
| Resistivity (Sheet) | | <10 | <20 | <30 |
| Particle size | nm | 50 nm-5 μm | 100 nm-5 μm | 150 nm-10 μm |
| Mono, bi-tri-layers | | >83% | >70% | >65% |

TABLE 5-continued

| | | Grade | | |
|---|---|---|---|---|
| | | EG016 | MG016 | NCG015 |
| | | Target Application | | |
| | | Electronics | Materials | Nanocomposites |
| Number | | 1 | 2 | 3 |
| Particle thickness | max | 1.7 nm | 2.5 nm | 2.8 nm |
| Layer count | | <10 | <15 | <16 |
| Density | g/cm$^3$ | 2.200 | 2.200 | 2.200 |
| Specific surface area | m$^2$/g | 250.0 | 180.0 | 100.0 |

Table 6 below shows a silica tread formulation, with units being in PHR. Graphene is added in increments of 0.5, 1.0, 2.0, 4.0, and 10.0 PHR. The graphene plate aspect ratio is up to 15 times that of clay in rubber nanocomposites. Exfoliation can also be easier than clay nanocomposites, thereby achieving effective properties at lower levels of graphene.

TABLE 6

| SSBR | 25% B.S., OE 27% | 96.00 |
|---|---|---|
| Polybutadiene | Nd | 30.00 |
| Ultrasil 7000 | HDS | 80.00 |
| Si69 | X50S | 12.80 |
| Escorez 1102 | | 4.00 |
| TDAE (aromatic oil) | | 6.00 |
| 6PPD | | 1.50 |
| TMQ | | 1.00 |
| Paraffinic wax | | 0.50 |
| Microcrystalline wax | | 0.50 |
| Zinc Oxide | | 3.00 |
| Stearic acid | | 2.00 |
| CBS | | 1.50 |
| DPG | | 2.00 |

TABLE 6-continued

| Sulfur | 1.50 |
|---|---|
| PVI | 0.20 |

Figure 5:
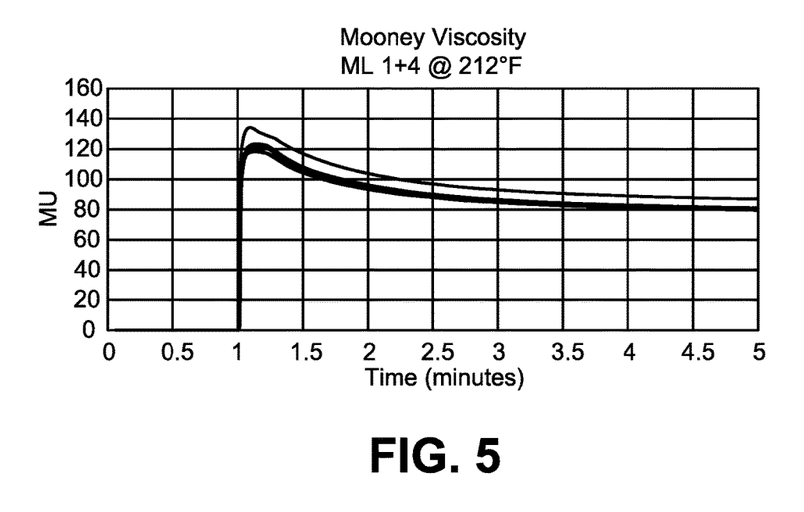
FIG. 5 shows a chart of Mooney viscosity.
Figure 6:
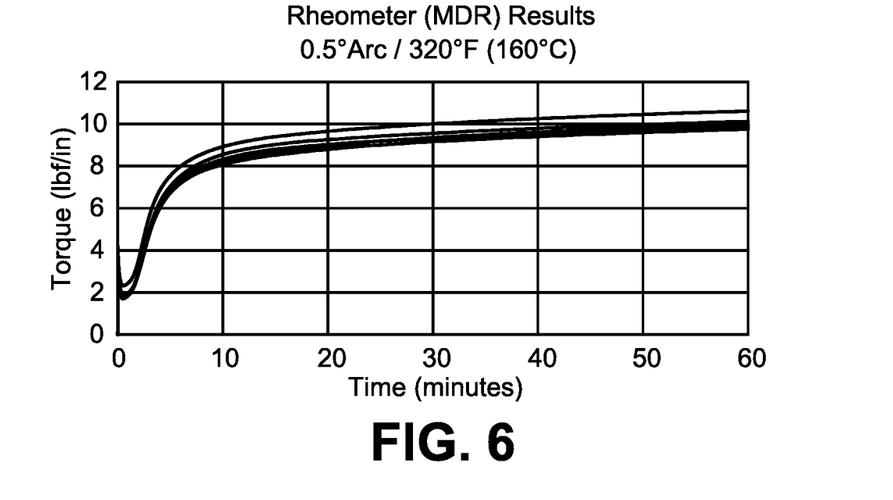
FIG. 6 shows a chart of rheometer results.
Figure 7:
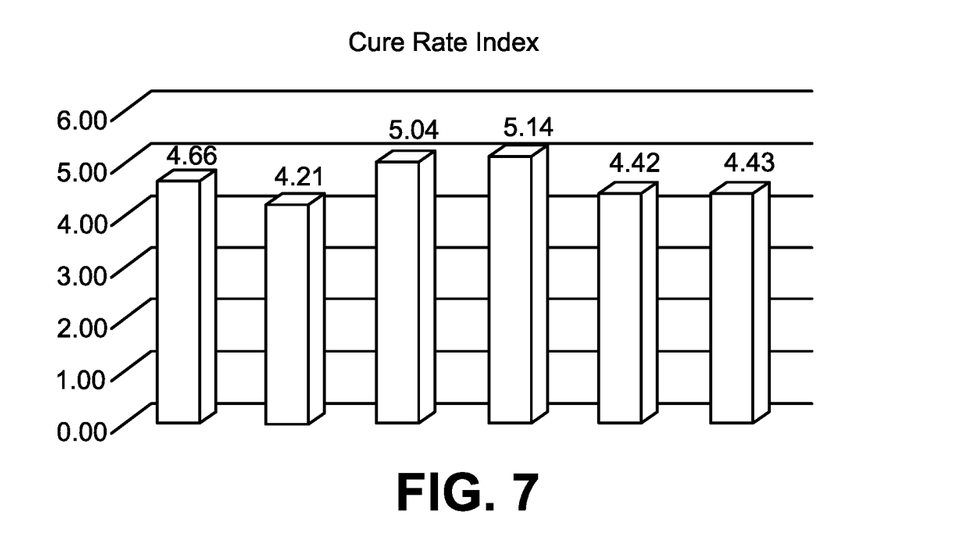
FIG. 7 shows a chart of cure rate index.

With reference to FIGS. 5-7, the addition of graphene does not shift viscosity or change compound processability. As graphene levels increase toward 10.0 PHR, rheometer torque increases slightly. Tensile strength ranges from 16.0 MPa to 16.7 MPa, 300% modulus is in the range of 11.7 MPa to 15.7 MPa, the modulus ratio is greater than four, the Shore A hardness is between 59 and 60, and the DIN abrasion resistance is within a narrow range. A modulus ratio of at least greater than 3.5 shows quality of mixing.

Figure 8:
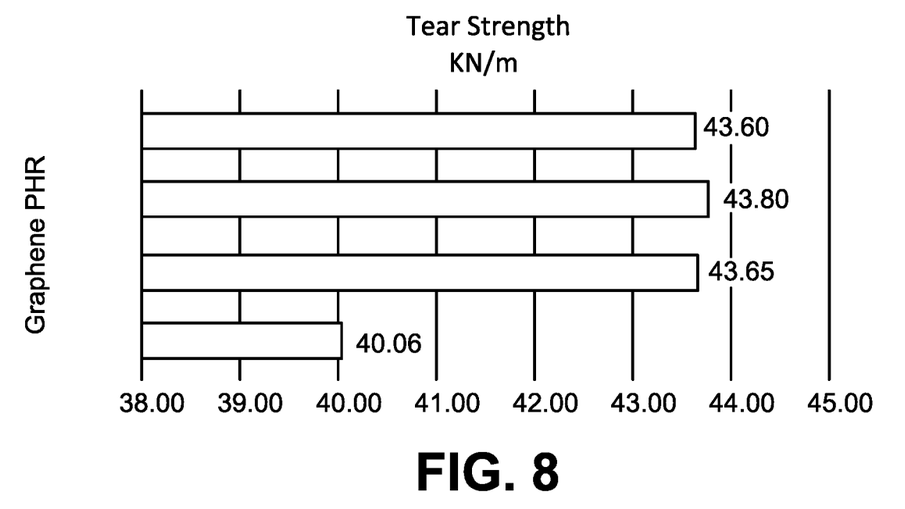
FIG. 8 shows a chart of tear strength.
Figure 9:
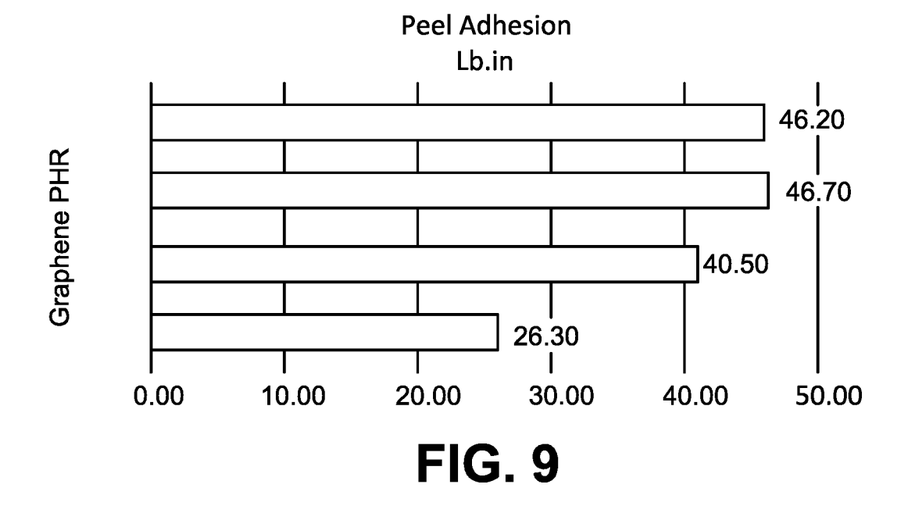
FIG. 9 shows a chart of peel adhesion.

With reference to FIGS. 8 and 9, the addition of graphene to silica tire tread compounds shows significant improvement in tear strength and peel adhesion, with increases being observed when graphene amounts are at about 0.5 PHR. The graphene's large aspect ratio plate-like structures arrest tear propagation, increases mixing shear, and improves dispersion and homogeneity.

Figure 10:
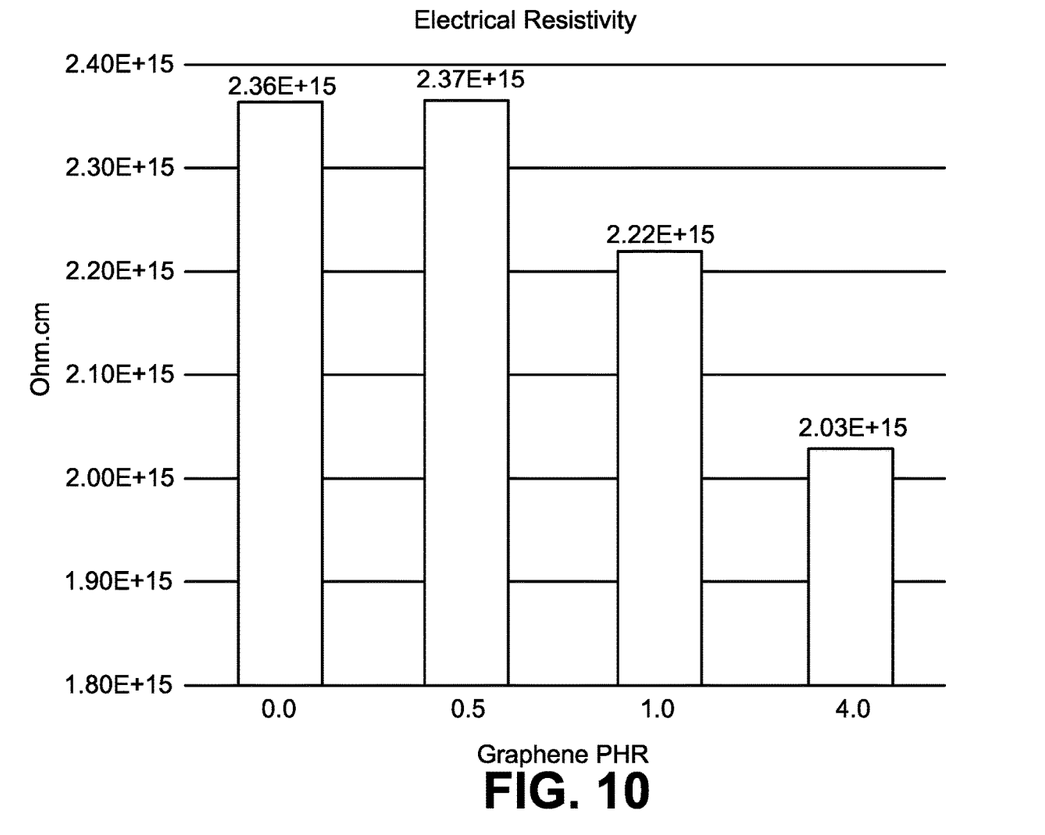
FIG. 10 shows a chart of electrical resistivity.
Figure 10A:
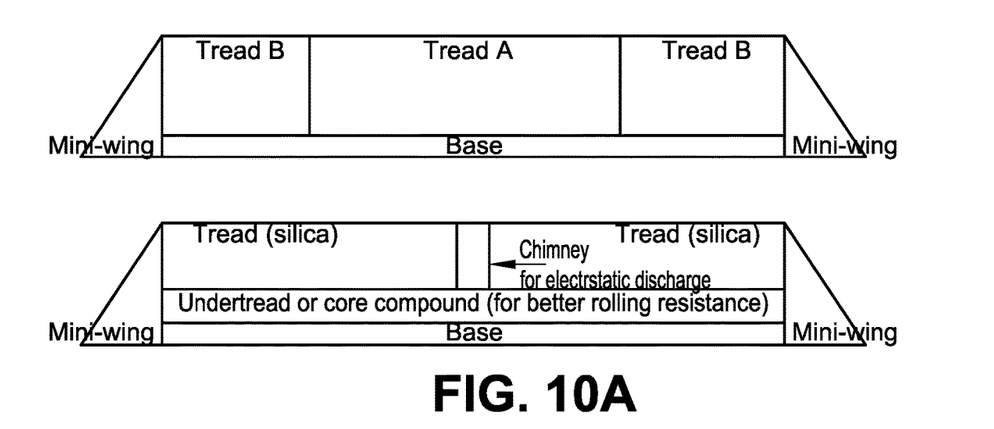
FIG. 10A shows a diagram of quadruplex and pentaplex units.

With reference to FIGS. 10 and 10A, the addition of graphene can lower electrical resistivity, which increases conductivity. The increased conductivity in silica tire tread compounds can facilitate electrostatic discharge. When quadruplex and pentaplex units are not available, graphene added to the treads produced by duplex or triplex extensions can help meet electrostatic discharge needs. When all, or substantially all, of the graphene plates are parallel and in contact with each other, the electrical resistivity will be optimal. The addition of about between 15.0 PHR and 20.0 PHR of graphene would create full contact of parallel graphene plates. Additionally, graphene can be added to the chimney of the tire tread.

Figure 11:
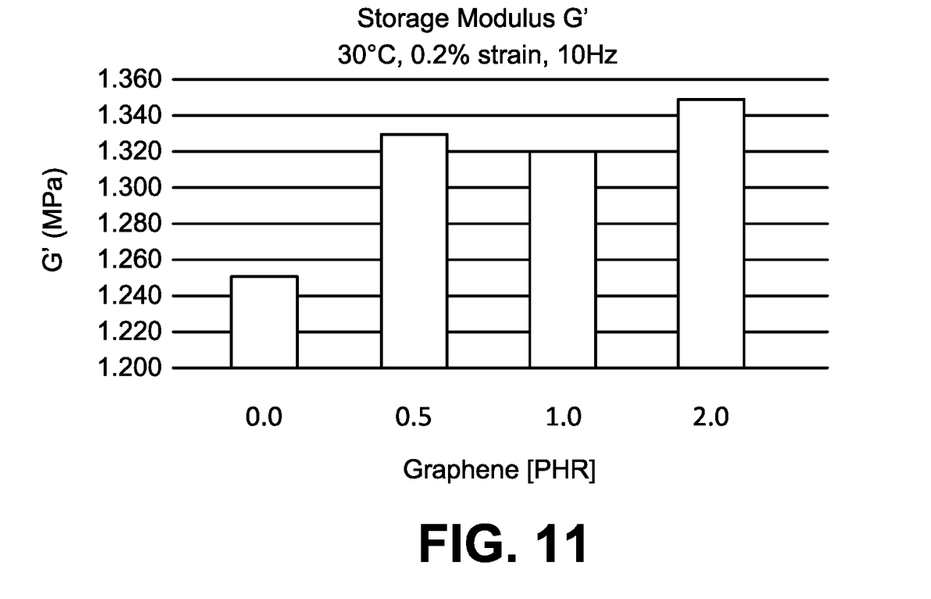
FIG. 11 shows a chart of storage modulus G'.
Figure 12:
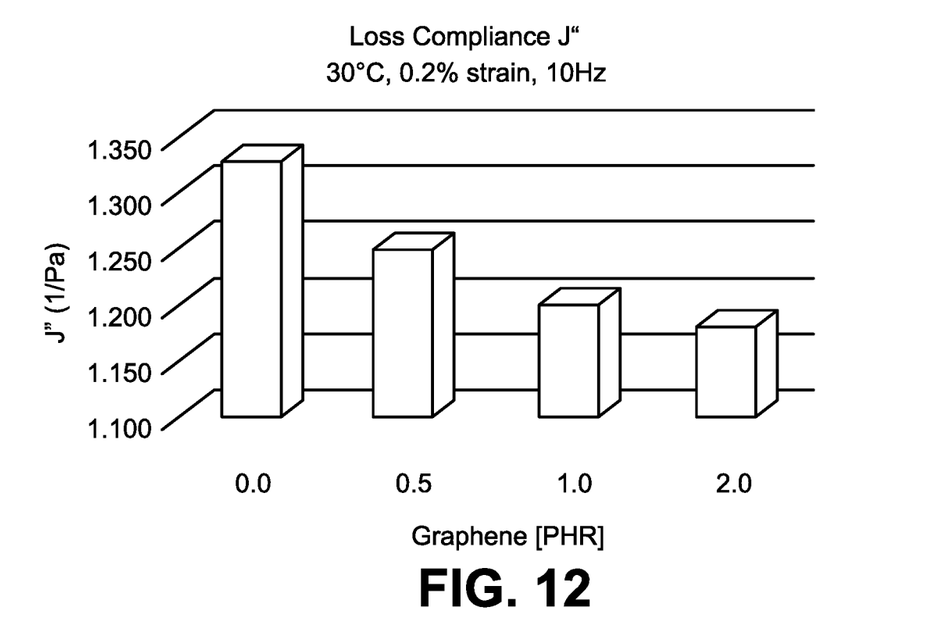
FIG. 12 shows a chart of loss compliance J".

With reference to FIGS. 11 and 12, the increase in storage modulus benefits global wear, irregular wear resistance, and improved cornering coefficient. The lower loss compliance and the tan delta results at 30° C. indicate lower rolling resistance. The addition of graphene also does not lead to any loss in D', J' elastic compliance modulus.

TABLE 7

| | | Compound | | | | | |
|---|---|---|---|---|---|---|---|
| | | 1 | 2 | 3 | 4 | 5 | 6 |
| | | Lab Number | | | | | |
| | Grade | ERTB10-78-21 | ERTB10-78-22 | ERTB10-78-23 | ERTB10-78-24 | ERTB10-78-25 | ERTB10-78-26 |
| SSBR | 25% B.S., OE 27% | 96.00 | 96.00 | 96.00 | 96.00 | 96.00 | 96.00 |
| Polybutadiene | Nd | 30.00 | 30.00 | 30.00 | 30.00 | 30.00 | 30.00 |
| Ultrasil 7000 | HDS | 80.00 | 80.00 | 80.00 | 80.00 | 80.00 | 80.00 |
| Si69 | X50S | 12.80 | 12.80 | 12.80 | 12.80 | 12.80 | 12.80 |
| Graphene | | 0.00 | 0.50 | 1.00 | 2.00 | 4.00 | 10.00 |
| Escorez 1102 | | 4.00 | 4.00 | 4.00 | 4.00 | 4.00 | 4.00 |
| TDAE (aromatic oil) | | 6.00 | 6.00 | 6.00 | 6.00 | 6.00 | 6.00 |
| 6PPD | | 1.50 | 1.50 | 1.50 | 1.50 | 1.50 | 1.50 |
| TMQ | | 1.00 | 1.00 | 1.00 | 1.00 | 1.00 | 1.00 |
| Paraffinic wax | | 0.50 | 0.50 | 0.50 | 0.50 | 0.50 | 0.50 |
| Microcrystalline wax | | 0.50 | 0.50 | 0.50 | 0.50 | 0.50 | 0.50 |
| Zinc Oxide | | 3.00 | 3.00 | 3.00 | 3.00 | 3.00 | 3.00 |
| Stearic acid | | 2.00 | 2.00 | 2.00 | 2.00 | 2.00 | 2.00 |
| CBS | | 1.50 | 1.50 | 1.50 | 1.50 | 1.50 | 1.50 |
| DPG | | 2.00 | 2.00 | 2.00 | 2.00 | 2.00 | 2.00 |
| Sulfur | | 1.50 | 1.50 | 1.50 | 1.50 | 1.50 | 1.50 |
| PVI | | 0.20 | 0.20 | 0.20 | 0.20 | 0.20 | 0.20 |
| Total PHR | | 242.50 | 243.00 | 243.50 | 244.50 | 246.50 | 252.50 |

TABLE 8

| | | | | | | | |
|---|---|---|---|---|---|---|---|
| Mooney Viscosity | ML 1 + 4 | 100° C. | 100° C. | 100° C. | 100° C. | 100° C. | 100° C. |
| Mooney Peak | | 121.6 | 118.2 | 123.4 | 121.3 | 121.5 | 134.2 |
| ML 1 + 4 | 100° C. | 80.2 | 79.5 | 81.1 | 80.8 | 79.5 | 86.9 |
| Aged Mooney | 7 days | | | | | | |
| Mooney Peak | | 170 | 163 | 167 | 167 | 162 | 178 |
| ML 1 + 4 | 100° C. | 93.8 | 92.8 | 94.1 | 93.5 | 91.8 | 99.5 |
| MDR Rheometer | Temperature | 160° C. | 160° C. | 160° C. | 160° C. | 160° C. | 160° C. |
| | Arc | 0.5 | 0.5 | 0.5 | 0.5 | 0.5 | 0.5 |
| MH | | 8.01 | 8.13 | 8.07 | 8.29 | 8.20 | 8.30 |
| ML | | 1.74 | 1.70 | 1.83 | 1.84 | 1.78 | 1.78 |
| Delta Torque | | 6.27 | 6.43 | 6.24 | 6.45 | 6.42 | 5.98 |
| ts1 | | 1.82 | 1.77 | 1.83 | 1.82 | 1.82 | 1.79 |
| t10 | | 1.65 | 1.60 | 1.65 | 1.65 | 1.62 | 0.81 |
| t50 | | 3.75 | 3.69 | 3.71 | 3.70 | 3.75 | 3.62 |
| t90 | | 23.10 | 25.38 | 21.49 | 21.11 | 24.25 | 23.40 |
| CRI | | 4.66 | 4.21 | 5.04 | 5.14 | 4.42 | 4.43 |

TABLE 9

| | | Compound | | | | | |
|---|---|---|---|---|---|---|---|
| | | 1 | 2 | 3 | 4 | 5 | 6 |
| | | Lab Number | | | | | |
| | Grade | ERTB10-78-21 | ERTB10-78-22 | ERTB10-78-23 | ERTB10-78-24 | ERTB10-78-25 | ERTB10-78-26 |
| SSBR | 2.5% B.S., OE 27% | 96.00 | 96.00 | 96.00 | 96.00 | 96.00 | 96.00 |
| Polybutadiene | Ni or Nd | 30.00 | 30.00 | 30.00 | 30.00 | 30.00 | 30.00 |
| Ultrasil 7000 | HDS | 80.00 | 80.00 | 80.00 | 80.00 | 80.00 | 80.00 |
| Si69 | X50S | 12.80 | 12.80 | 12.80 | 12.80 | 12.80 | 12.80 |
| Graphene | | 0.00 | 0.50 | 1.00 | 2.00 | 4.00 | 10.00 |
| Tensile Strength | MPa | 16.64 | 15.99 | 16.32 | 16.88 | 16.87 | 16.66 |
| Elongation | % | 354 | 353 | 358 | 366 | 380 | 309 |
| 50% Modulus | MPa | 1.18 | 1.18 | 1.16 | 1.25 | 1.23 | 1.70 |
| 100% Modulus | MPa | 2.25 | 2.30 | 2.28 | 2.44 | 2.38 | 3.67 |
| 200% Modulus | MPa | 6.17 | 6.26 | 6.29 | 6.50 | 6.17 | 8.80 |
| 300% Modulus | MPa | 12.27 | 12.34 | 12.51 | 12.56 | 11.76 | 15.61 |
| Modulus Ratio | MPa | 5.46 | 5.37 | 5.49 | 5.15 | 4.94 | 4.25 |
| Shore A | | 59 | 60 | 60 | 60 | 60 | 64 |
| Tear Strength | | | | | | | |
| Peak Tear | KNm | 85.11 | 92.07 | 86.45 | 91.27 | 94.30 | 85.82 |
| Tear Die B | KNm | 40.06 | 43.65 | 40.52 | 43.80 | 43.60 | 40.50 |
| Strebler Adhesion | lb · in | 26.30 | 40.50 | 46.70 | 46.20 | 31.30 | 17.30 |
| Din Abrasion | | | | | | | |
| Weight Loss | | 136.3 | 122.8 | 134.4 | 144.5 | 146.5 | 201.5 |
| Weight Loss | | 119.7 | 129.1 | 136.7 | 143.6 | 158.3 | 209.5 |
| Weight Loss | | 124.3 | 131.6 | 147.3 | 154.9 | 144.1 | 187.6 |
| Mean | | 127 | 128 | 139 | 148 | 150 | 200 |
| Volume loss (mm3) | | 103 | 93 | 102 | 110 | 111 | 150 |
| Volume loss (mm3) | | 91 | 98 | 104 | 109 | 120 | 156 |
| Volume loss (mm3) | | 94 | 99 | 112 | 118 | 109 | 140 |
| Median | | 94 | 98 | 104 | 110 | 111 | 150 |
| Mean | | 96 | 97 | 106 | 112 | 113 | 149 |
| Electrical Resistivity | ohm*cm | | | | | | |
| Sample | 1 | 2.39E+15 | 2.75E+15 | 2.89E+15 | 2.72E+15 | 2.25E+15 | 2.62E+15 |
| ASTM D991 | 2 | 2.55E+15 | 2.08E+15 | 1.81E+15 | 2.54E+15 | 1.90E+15 | 3.02E+15 |
| | 3 | 2.14E+15 | 2.27E+15 | 1.95E+15 | 2.59E+15 | 1.94E+15 | 2.80E+15 |
| Mean | average | 2.36E+15 | 2.37E+15 | 2.22E+15 | 2.62E+15 | 2.03E+15 | 2.81E+15 |

TABLE 10

| | | Compound | | | | | |
|---|---|---|---|---|---|---|---|
| | | 1 | 2 | 3 | 4 | 5 | 6 |
| | | Lab Number | | | | | |
| | Grade | ERTB10-78-21 | ERTB10-78-22 | ERTB10-78-23 | ERTB10-78-24 | ERTB10-78-25 | ERTB10-78-26 |
| SSBR | 25% B.S., OE 27% | 96.00 | 96.00 | 96.00 | 96.00 | 96.00 | 96.00 |
| Polybutadiene | Ni or Nd | 30.00 | 30.00 | 30.00 | 30.00 | 30.00 | 30.00 |
| Ultrasil 7000 | HDS | 80.00 | 80.00 | 80.00 | 80.00 | 80.00 | 80.00 |
| Si69 | X50S | 12.80 | 12.80 | 12.80 | 12.80 | 12.80 | 12.80 |
| Graphene | | 0.00 | 0.50 | 1.00 | 2.00 | 4.00 | 10.00 |
| DMTA Strain Sweep 30 C., 0.2% strain, Sample 1 10 Hz | | | | | | | |
| G' | MPa | 1.250 | 1.330 | 1.320 | 1.350 | 1.180 | 1.420 |
| G" | MPa | 0.214 | 0.229 | 0.132 | 0.223 | 0.219 | 0.249 |
| tan delta | | 0.172 | 0.172 | 0.163 | 0.164 | 0.186 | 0.175 |
| d* | | 9.732 | 9.756 | 9.279 | 9.332 | 10.538 | 9.954 |
| J' | ×10−7 | 7.780 | 7.290 | 7.370 | 7.190 | 8.220 | 6.840 |
| J" | ×10−7 | 1.330 | 1.250 | 1.200 | 1.180 | 1.520 | 1.200 |
| Sample 2 | | | | | | | |
| G' | MPa | 1.250 | 1.330 | 1.320 | 1.350 | 1.180 | 1.410 |
| G" | MPa | 0.212 | 0.227 | 0.214 | 0.221 | 0.218 | 0.247 |
| tan delta | | 0.171 | 0.171 | 0.163 | 0.164 | 0.185 | 0.175 |
| d* | | 9.669 | 9.700 | 9.244 | 9.289 | 8.360 | 9.910 |
| J' | ×10−7 | 7.800 | 7.130 | 7.390 | 7.210 | 8.220 | 6.870 |
| J" | ×10−7 | 1.330 | 1.250 | 1.200 | 1.180 | 1.520 | 1.200 |
| Mean | | | | | | | |
| G' | MPa | 1.250 | 1.330 | 1.320 | 1.350 | 1.180 | 1.415 |
| G" | MPa | 0.213 | 0.228 | 0.173 | 0.222 | 0.219 | 0.248 |
| tan delta | | 0.171 | 0.171 | 0.163 | 0.164 | 0.186 | 0.175 |
| D* | | 9.701 | 9.728 | 9.262 | 9.310 | 9.449 | 9.932 |
| J' | ×10−7 | 7.790 | 7.210 | 7.380 | 7.200 | 8.220 | 6.855 |
| J" | ×10−7 | 1.330 | 1.250 | 1.200 | 1.180 | 1.520 | 1.200 |
| DMTA Temperature Sweep (tension at 0.2% strain) | | | | | | | |
| Complex Modulus (E*) MPa, −20° C. | | 47.600 | 54.900 | 44.000 | 41.600 | 42.700 | 57.900 |
| tan delta | −10° C. | 0.407 | 0.433 | 0.401 | 0.416 | 0.424 | 0.441 |
| tan delta | | 0.244 | 0.237 | 0.253 | 0.234 | 0.232 | 0.243 |
| Tg (Max E') | ° C. | −46.400 | −45.600 | −46.200 | −46.400 | −47.100 | −45.600 |
| Tg (Max tan delta) | ° C. | −25.300 | −24.500 | −25.000 | −25.200 | −24.700 | −24.600 |

Clause 1—A rubber composition including styrene butadiene rubber, silicon dioxide, bis[3-(triethoxysilyl)propyl]polysulfide, graphene, wherein the graphene has a thickness of less than about 3.2 nm, a particle size of between about 50 nm and about 10 μm, and contains greater than about 95% carbon, aliphatic hydrocarbon resin, treated distillate aromatic extract. N-(1,3-dimethylbutyl)-N'-phenyl-1,4-benzenediamine, 2,2,4-trimethyl-1,2-dihydroquinoline, paraffinic wax, microcrystalline wax, zinc oxide, stearic acid, N-cyclohexyl-2-benzothiazole sulfonamide, 1.3 diphenylguanidine, sulfur, and pre vulcanization inhibitor.

Clause 2—A rubber composition including styrene butadiene, silicon dioxide, organosilane, and graphene, wherein the graphene has a thickness of less than about 3.2 nm, a particle size of between about 50 nm and about 10 μm, and contains greater than about 95% carbon.

Clause 3—The rubber composition of clauses 1 or 2, wherein the graphene is a graphene plate, wherein the graphene plate is between about 0.5 PHR and about 10.0 PHR.

Clause 4—The rubber composition of clauses 1-3, wherein the graphene plate has a surface area from about 100 m²/gram to about 250 m²/gram.

Clause 5—The rubber composition of clauses 1-4, wherein the graphene plate has an oxygen content of less than about 1%.

Clause 6—The rubber composition of clauses 1-5, wherein the thickness is less than about 1 nm and the aspect ratio is about 1000.

Clause 7—The rubber composition of clauses 1-6, wherein the graphene plate is between about 0.5 PHR and about 8.0 PHR.

Clause 8—The rubber composition of clauses 2-7, wherein the rubber composition further includes aliphatic hydrocarbon resin, treated distillate aromatic extract, an antiozonant, and an antioxidant.

Clause 9—The rubber composition of clauses 2-8, wherein the rubber composition further includes paraffinic wax, microcrystalline wax, zinc oxide, stearic acid, an accelerator, a secondary accelerator, sulfur, and a pre vulcanization inhibitor.

Clause 10—The rubber composition of clauses 8-10, wherein the antiozonant is N-(1,3-dimethylbutyl)-N'-phenyl-1,4-benzenediamine and the antioxidant is 2,2,4-trimethyl-1,2-dihydroquinoline.

Clause 11—The rubber composition of clauses 9 or 10, wherein the accelerator is N-cyclohexyl-2-benzothiazole sulfonamide and the secondary accelerator is 1,3-diphenylguanidine.

Clause 12—The rubber composition of clauses 3-11, wherein the graphene plate is between about 1.0 PHR and about 2.0 PHR, wherein the composition has no clay fillers.

Clause 13—The rubber composition of clauses 3-11, wherein the graphene plate is between about 3.0 PHR and about 5.0 PHR.

Clause 14—The rubber composition of clauses 1-13, wherein the graphene is graphene plates, wherein substantially all of the graphene plates are parallel and in contact with each other.

Clause 15—The rubber composition of clause 14, wherein the graphene plate is between about 15.0 PHR and about 20.0 PHR.

Clause 16—The rubber composition of clauses 1-15, wherein the rubber composition is a silica tread composition.

Clause 17—The rubber composition of clauses 2-7, wherein the rubber composition is chosen from the group consisting of a silica tread composition, seals, gaskets, medical gloves, beverage bottles, and chemical and solvent resistant gloves.

Non-limiting aspects have been described, hereinabove. It will be apparent to those skilled in the art that the above methods and apparatuses may incorporate changes and modifications without departing from the general scope of the present subject matter. It is intended to include all such modifications and alterations in so far as they come within the scope of the appended claims or the equivalents thereof.

We claim:

1. A rubber composition comprising:
styrene butadiene rubber;
silicon dioxide;
bis[3-(triethoxysilyl)propyl]polysulfide;
graphene, wherein the graphene has a thickness of less than about 3.2 nm, a particle size of between about 50 nm and about 10 μm, and contains greater than about 95% carbon;
aliphatic hydrocarbon resin;
treated distillate aromatic extract;
N-(1,3-dimethylbutyl)-N'-phenyl-1,4-benzenediamine;
2,2,4-trimethyl-1,2-dihydroquinoline;
paraffinic wax;
microcrystalline wax;
zinc oxide;
stearic acid;
N-cyclohexyl-2-benzothiazole sulfonamide;
1,3 diphenylguanidine;
sulfur; and
pre vulcanization inhibitor.

2. A rubber composition comprising:
styrene butadiene;
silicon dioxide;
organosilane; and
graphene, wherein the graphene has a thickness of less than about 3.2 nm, a particle size of between about 50 nm and about 10 μm, and contains greater than about 95% carbon.

3. The rubber composition of claim 2, wherein the graphene is a graphene plate, wherein the graphene plate is between about 0.5 PHR and about 10.0 PHR.

4. The rubber composition of claim 3, wherein the graphene plate has a surface area from about 100 $m^2$/gram to about 250 $m^2$/gram.

5. The rubber composition of claim 4, wherein the graphene plate has an oxygen content of less than about 1%.

6. The rubber composition of claim 2, wherein the thickness is less than about 1 nm and the aspect ratio is about 1000.

7. The rubber composition of claim 3, wherein the graphene plate is between about 0.5 PHR and about 8.0 PLR.

8. The rubber composition of claim 7, wherein the rubber composition further comprises:
aliphatic hydrocarbon resin;
treated distillate aromatic extract;
an antiozonant; and,
an antioxidant.

9. The rubber composition of claim 8, wherein the rubber composition further comprises:
paraffinic wax;
microcrystalline wax;
zinc oxide;
stearic acid;
an accelerator;
a secondary accelerator;
sulfur; and
a pre vulcanization inhibitor.

10. The rubber composition of claim 9, wherein the antiozonant is N-(1,3-dimethylbutyl)-N'-phenyl-1,4-benzenediamine and the antioxidant is 2,2,4-trimethyl-1,2-dihydroquinoline.

11. The rubber composition of claim 10, wherein the accelerator is N-cyclohexyl-2-benzothiazole sulfonamide and the secondary accelerator is 1,3-diphenylguanidine.

12. The rubber composition of claim 6, wherein the graphene plate is between about 1.0 PHR and about 2.0 PHR, wherein the composition has no clay fillers.

13. The rubber composition of claim 6, wherein the graphene plate is between about 3.0 PHR and about 5.0 PHR.

14. The rubber composition of claim 2, wherein the graphene is graphene plates, wherein substantially all of the graphene plates are parallel and in contact with each other.

15. The rubber composition of claim 14, wherein the graphene plate is between about 15.0 PHR and about 20.0 PHR.

16. The rubber composition of claim 1, wherein the rubber composition is a silica tread composition.

17. The rubber composition of claim 2, wherein the rubber composition is chosen from the group consisting of a silica tread composition, seals, gaskets, medical gloves, beverage bottles, and chemical and solvent resistant gloves.

* * * * *